United States Patent
Park et al.

(10) Patent No.: US 9,630,579 B2
(45) Date of Patent: Apr. 25, 2017

(54) BUMPER BACK-BEAM FOR VEHICLES

(71) Applicants: Hyundai Motor Company, Seoul (KR); Hanwha Advanced Materials Corporation, Seoul (KR)

(72) Inventors: Sang Sun Park, Gyeonggi-do (KR); Sung Ki Shin, Gyeonggi-do (KR); Kieyoun Jeong, Gyeonggi-do (KR); Seok Hwan Kim, Gyeonggi-do (KR); Do Wan Lim, Gyeongsangnam-do (KR); Joung Myung Lim, Chungcheongbuk-do (KR); Ji Hwan Choi, Seoul (KR)

(73) Assignees: Hyundai Motor Company, Seoul (KR); Hanwha Advanced Materials Corporation, Seoul (KR)

( * ) Notice: Subject to any disclaimer, the term of this patent is extended or adjusted under 35 U.S.C. 154(b) by 0 days.

(21) Appl. No.: 14/734,542

(22) Filed: Jun. 9, 2015

(65) Prior Publication Data

US 2016/0272136 A1    Sep. 22, 2016

(30) Foreign Application Priority Data

Mar. 16, 2015  (KR) .................. 10-2015-0035982

(51) Int. Cl.
*B60R 19/03* (2006.01)
*B32B 1/00* (2006.01)
(Continued)

(52) U.S. Cl.
CPC ............. *B60R 19/03* (2013.01); *B32B 1/00* (2013.01); *B32B 5/26* (2013.01); *B32B 27/08* (2013.01);
(Continued)

(58) Field of Classification Search
CPC ... C04B 41/52; C04B 41/009; C04B 41/4564; C08K 7/14; Y10T 428/249924;
(Continued)

(56) References Cited

U.S. PATENT DOCUMENTS 3,883,168 A * 5/1975 Goupy .................. B29C 70/08
                                                        293/120
3,993,829 A * 11/1976 Park ...................... D01F 11/14
                                                        428/408
(Continued)

FOREIGN PATENT DOCUMENTS

JP    2008-110566 A    5/2008
KR    3043941 U        9/1997
(Continued)

*Primary Examiner* — Kiran B Patel
(74) *Attorney, Agent, or Firm* — Mintz Levin Cohn Ferris Glovsky and Popeo, P.C.; Peter F. Corless

(57) ABSTRACT

A bumper back-beam for a vehicle is provided. The bumper back beam includes a glass fiber mat reinforced plastic composite and a carbon fiber reinforced plastic composite disposed within the glass fiber reinforced plastic composite. The glass fiber mat reinforced plastic composite includes polypropylene at about 45 to 60 wt. %, glass fiber at about 35 to 45 wt. %, a crosslink agent at about 0.1 to 10 wt. %, peroxide at 0.1 to 4 wt. %, and an antioxidant at about 0.1 to 4 wt. %. The carbon fiber reinforced plastic composite includes a thermoplastic resin at about 40 to 60 wt. % and a carbon reinforced fiber at about 40 to 60 wt. % arranged in a predetermined direction.

9 Claims, 4 Drawing Sheets

US 9,630,579 B2
Page 2

(51) Int. Cl.
*B32B 5/26* (2006.01)
*B32B 27/08* (2006.01)
*B60R 19/18* (2006.01)

(52) U.S. Cl.
CPC ........ *B60R 19/18* (2013.01); *B32B 2262/101* (2013.01); *B32B 2262/106* (2013.01); *B32B 2605/08* (2013.01); *B60R 2019/1853* (2013.01)

(58) Field of Classification Search
CPC . B60R 19/03; B60R 19/18; B60R 2019/1853; B60R 19/34; B29L 2031/3044
USPC ........ 293/120, 133, 102, 121; 428/902, 408, 428/113
See application file for complete search history.

(56) References Cited

U.S. PATENT DOCUMENTS

| | | | | |
|---|---|---|---|---|
| 4,034,137 A * | 7/1977 | Hofer | B32B 7/04 | 156/295 |
| 4,042,746 A * | 8/1977 | Hofer | B29C 44/5618 | 156/295 |
| 4,250,136 A * | 2/1981 | Rex | B29C 67/221 | 264/257 |
| 4,314,002 A * | 2/1982 | Oizumi | B32B 27/10 | 174/255 |
| 4,339,144 A * | 7/1982 | Nagasaka | B60R 19/03 | 228/903 |
| 4,401,715 A * | 8/1983 | Nomura | B29C 43/203 | 428/306.6 |
| 4,428,998 A * | 1/1984 | Hawkinson | B32B 5/26 | 220/900 |
| 4,812,359 A * | 3/1989 | Hall | B32B 17/10018 | 156/105 |
| 4,861,097 A * | 8/1989 | Wycech | B60J 5/0437 | 296/146.6 |
| 4,892,774 A * | 1/1990 | Vallance | B32B 27/12 | 156/182 |
| 4,961,700 A * | 10/1990 | Dunbar | B29C 43/36 | 264/257 |
| 5,190,802 A * | 3/1993 | Pilato | B32B 5/26 | 156/306.6 |
| 5,356,958 A * | 10/1994 | Matthews | C08J 9/32 | 521/54 |
| 5,391,425 A * | 2/1995 | Isley, Jr. | B29C 70/025 | 428/102 |
| 5,464,671 A * | 11/1995 | Harada | B29C 70/86 | 283/109 |
| 5,521,000 A * | 5/1996 | Owens | F01L 3/205 | 123/65 V |
| 5,560,985 A * | 10/1996 | Watanabe | A43B 23/086 | 442/229 |
| 5,562,981 A * | 10/1996 | Ehrlich | B29C 70/025 | 156/229 |
| 5,700,743 A * | 12/1997 | Puchinger | B29C 70/088 | 428/337 |
| 5,707,723 A * | 1/1998 | Harrison | B29C 70/086 | 428/313.3 |
| 5,711,562 A * | 1/1998 | Terada | B60R 19/50 | 293/120 |
| 5,725,940 A * | 3/1998 | Sakai | B29C 70/086 | 428/304.4 |
| 5,804,511 A * | 9/1998 | Kelman | B29C 67/246 | 442/172 |
| 5,996,521 A * | 12/1999 | Kitano | B32B 1/08 | 114/90 |
| 6,440,566 B1 * | 8/2002 | Maligie | B29C 33/68 | 156/244.11 |
| 6,451,231 B1 * | 9/2002 | Harrison | B29C 70/66 | 264/271.1 |
| 6,998,359 B2 * | 2/2006 | Bingenheimer | B32B 5/18 | 156/325 |
| 8,071,491 B2 * | 12/2011 | Balthes | B29C 43/021 | 442/247 |
| 8,158,539 B2 * | 4/2012 | Balthes | B29C 43/021 | 442/136 |
| 8,375,839 B2 * | 2/2013 | Landi | F41H 1/02 | 428/911 |
| 8,653,958 B2 * | 2/2014 | Tanabe | B60R 19/20 | 293/132 |
| 2004/0062915 A1 * | 4/2004 | Pabedinskas | B29C 47/0023 | 428/188 |
| 2005/0082852 A1 * | 4/2005 | Corscadden | B29C 70/46 | 293/120 |
| 2007/0202295 A1 * | 8/2007 | Kamiya | B32B 5/024 | 428/103 |
| 2007/0202314 A1 * | 8/2007 | Youn | B32B 27/12 | 428/297.4 |
| 2007/0261788 A1 * | 11/2007 | Stenard | B29C 33/40 | 156/307.1 |
| 2008/0203743 A1 * | 8/2008 | Dekeyser | B60R 19/18 | 293/120 |
| 2009/0061242 A1 * | 3/2009 | Miller | B25J 9/0012 | 428/457 |
| 2009/0324966 A1 * | 12/2009 | Benitsch | F41H 5/0435 | 428/428 |
| 2010/0276830 A1 * | 11/2010 | Park | F42B 14/068 | 264/103 |
| 2015/0015006 A1 * | 1/2015 | Yabu | B60R 19/03 | 293/120 |
| 2015/0021941 A1 * | 1/2015 | Heberling | B60R 19/34 | 293/133 |
| 2015/0061320 A1 * | 3/2015 | Yabu | B60R 19/18 | 296/187.1 |
| 2015/0118928 A1 * | 4/2015 | Byun | B32B 27/12 | 442/60 |
| 2015/0266260 A1 * | 9/2015 | Fujioka | B32B 3/30 | 428/118 |
| 2015/0299913 A1 * | 10/2015 | Hori | B60R 19/03 | 428/34.1 |
| 2015/0321631 A1 * | 11/2015 | Hahn | B60R 19/34 | 293/122 |
| 2016/0001723 A1 * | 1/2016 | Oku | B60R 19/03 | 293/121 |
| 2016/0107693 A1 * | 4/2016 | Hogger | B62D 25/025 | 296/193.02 |
| 2016/0121827 A1 * | 5/2016 | Yabu | B60R 19/03 | 293/120 |
| 2016/0159300 A1 * | 6/2016 | Matecki | B23P 15/00 | 293/120 |

FOREIGN PATENT DOCUMENTS

| | | |
|---|---|---|
| KR | 10-2010-0123066 A | 11/2010 |
| KR | 2012-0124555 A | 11/2012 |
| KR | 10-2013-0047211 A | 5/2013 |

\* cited by examiner

BUMPER BACK-BEAM FOR VEHICLES

CROSS-REFERENCE TO RELATED APPLICATION

This application claims priority to and the benefit of Korean Patent Application No. 10-2015-0035982 filed in the Korean Intellectual Property Office on Mar. 16, 2015, the entire contents of which are incorporated herein by reference.

BACKGROUND (a) Field of the Invention

The present invention relates to a bumper back-beam for a vehicle.

(b) Description of the Related Art

In general, a vehicle bumper back-beam is a shock-absorbing part disposed on the front or the rear of the vehicle to minimize physical damage to a vehicle by elastically deforming during a vehicle collision at a low speed, protect passengers and minimize deformation of a vehicle by absorbing shock in a collision with another vehicle or a fixed object. When the strength of the bumper back-beam is increased, the weight and the cost are increased, conversely, when the weight and the cost are decreased, the strength is decreased, therefore, the function cannot be sufficiently achieved. Accordingly, a Glass fiber Mat Thermoplastic (hereinafter "GMT") that is a lighter material and strong has been developed.

The GMT is an advanced material that is a plate-shaped composite composed of polypropylene resin, which is common resin, and a glass fiber mat reinforced material. In particular, molten polypropylene extruded by a T-die and a glass fiber non-woven mat are directly impregnated, providing an improved bonding force with the resin. Further, the strength of the glass itself is reinforced in a mat type, and the strength is greater than other materials. Generally, GMT has a light weight and the degrees of freedom in design are features of plastics, and the thermoplastic resin and also provide a high productivity and reusability.

A front bumper back-beam protects against a high-speed collision, however, when it is made of GMT having improved shock resistance, the bumper back-beam breaks in a high-speed collision, and therefore it cannot be used by itself. Recently, a back-beam manufactured by inserting steel in GMT has been developed however; there is a limit in reducing weight. Furthermore, forming different materials simultaneously increases the difficulty of the process.

The above information disclosed in this section is merely for enhancement of understanding of the background of the invention and therefore it may contain information that does not form the prior art that is already known in this country to a person of ordinary skill in the art.

SUMMARY

The present invention provides a bumper back-beam for a vehicle. An exemplary embodiment of the present invention provides a bumper back-beam for a vehicle that may include a glass fiber mat reinforced plastic composite and a carbon fiber reinforced plastic composite disposed within the glass fiber reinforced plastic composite.

The glass fiber mat reinforced plastic composite may include polypropylene at about 45 to 60 wt. %, glass fiber at about 35 to 45 wt. %, a crosslink agent at about 0.1 to 10 wt. %, peroxide at about 0.1 to 4 wt. %, and an antioxidant at about 0.1 to 4 wt. %, and the carbon fiber reinforced plastic composite may include a thermoplastic resin at about 40 to 60 wt. % and a carbon reinforced fiber at about 40 to 60 wt. % arranged in a predetermined direction. The carbon fiber reinforced plastic composite may include a layer made of a carbon reinforced fiber arranged in a machine direction (MD) and a layer made of a carbon reinforced fiber that may be arranged in a transverse direction (TD). The carbon fiber reinforced plastic composite may include a structure having the layer made of a carbon reinforced fiber arranged in the machine direction and the layer made of a carbon reinforced fiber arranged in the transverse direction that may be alternately stacked forming two or more layers.

The carbon fiber reinforced plastic composite may include, in the carbon reinforced fiber, a carbon reinforced fiber at about 40 to 60 wt. % arranged in the machine direction and a carbon reinforced fiber at about 40 to 60 wt. % arranged in the transverse direction. The thermoplastic resin may be polypropylene. The glass fiber may include a uni-direction glass fiber and a random direction glass fiber. The entire glass fiber may include a uni-direction glass fiber at about 40 to 60 wt. % and a random direction glass fiber at about 40 to 60 wt. %. The glass fiber mat reinforced plastic composite may include a glass fiber treated with a sizing agent.

The bumper back-beam for a vehicle according to an exemplary embodiment may withstand a high-speed collision, and particularly, has excellent mechanical properties as a front bumper back-beam. Further, the bumper back-beam for a vehicle according to an exemplary embodiment has reduced weight, contributing to the decrease in weight of a bumper.

Effects that may be obtained or expected from exemplary embodiments of the present invention maybe directly or suggestively described in the following detailed description. For example, various effects expected from exemplary embodiments of the present invention will be described in the following detailed description.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE EMBODIMENTS

Figure 1:
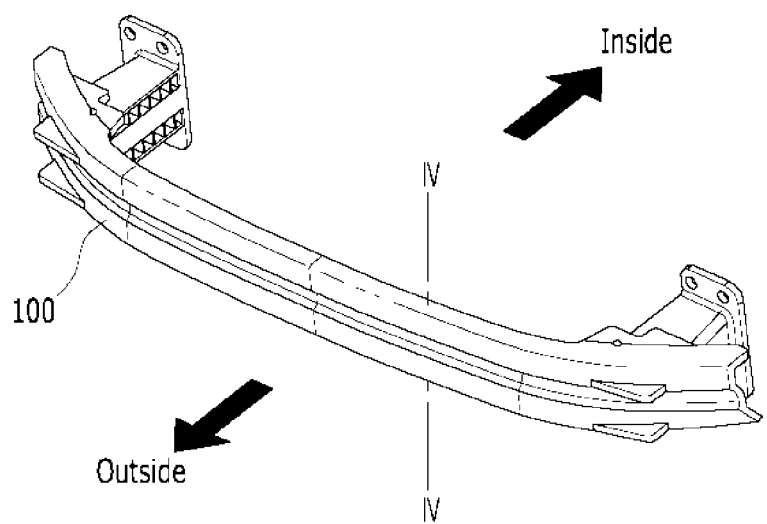
FIG. 1 is an exemplary embodiment of a view schematically showing an automotive bumper.

The terminologies used herein are for the purpose of describing particular embodiments and are not intended to limit the present invention. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, In order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween. The term 'including' used herein embodies concrete specific characteristics, regions, positive numbers, steps, operations, elements, and/or components, not limiting existence or addition of other specific characteristics, regions, positive numbers, steps, operations, elements, and/or components.

An exemplary embodiment of the present invention will hereinafter be described in detail with reference to the accompanying drawings. However, the drawings to be described below and the following detailed description relate to one exemplary embodiment of various exemplary embodiments for effectively explaining the characteristics of the present invention. Therefore, the present invention should not be construed as being limited to the drawings and the following description.

Further, in the description of the present invention, the detailed description of related well-known configurations and functions is not provided, when it is determined as unnecessarily making the scope of the present invention unclear. In addition, the terminologies to be described below are ones defined in consideration of their function in the present invention, and may be changed by the intention of a user, an operator, or a custom. Therefore, their definition should be determined on the basis of the description of the present invention.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, in the following exemplary embodiments, the terminologies are appropriately changed, combined, or divided so that those skilled in the art may clearly understand them, in order to efficiently explain the main technical characteristics of the present invention, but the present invention is not limited thereto.

A bumper back-beam 100 for a vehicle according to an exemplary embodiment of the present invention may include a glass fiber mat reinforced plastic composite 10 and a carbon fiber reinforced plastic composite 20 disposed within the glass fiber mat reinforced plastic composite 10.

FIG. 1 shows an exemplary embodiment of an automotive bumper. An exemplary embodiment, relates to a bumper back-beam 100 for a vehicle. The bumper back-beam 100 for a vehicle may be divided into an interior part and an exterior part. The interior side of a vehicle is adjacent and faces towards the passenger cabin and the exterior side of a vehicle faces away from the passenger cabin towards the surrounding environment, when the vehicle is seen from above. For example, for a front bumper, the front side of a vehicle is the exterior and the rear side of the vehicle is the interior.

Figure 2A:
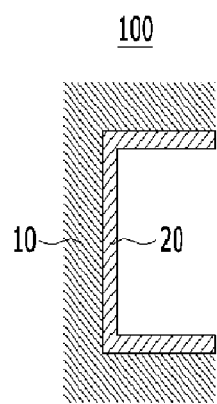
FIGS. 2A-2C are exemplary embodiments of views schematically showing cross-sectional structures taken along a line IV-IV of FIG. 1.

FIG. 2A shows a cross-sectional structure of the bumper back-beam 100 according to an exemplary embodiment. As shown in FIG. 2A, the bumper back-beam 100 according to an exemplary embodiment may have a substantially U-shaped cross-section when the carbon fiber reinforced plastic composite 20 is disposed within the glass fiber mat reinforced plastic composite 10. The structure having the glass fiber mat reinforced plastic composite 10 at the exterior protects the carbon fiber reinforced plastic composite 20 at the interior. Further, the carbon fiber reinforced plastic composite 20 having high tensile strength may reinforce the portion of the bumper back-beam 100 where the greatest tension is applied, thereby improving the mechanical properties.

Figure 2B:
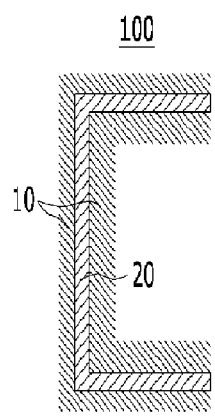
Figure 2C:
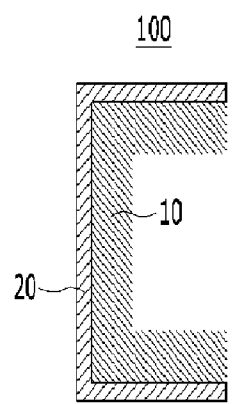

Unlike the exemplary cross-sectional structure of the bumper back-beam 100, when the structures shown in FIG. 2B or 2C are selected, the mechanical properties may become problematic. In particular, when the carbon fiber reinforced plastic composite 20 is disposed between the glass fiber reinforced plastic composites 10, as shown in FIG. 2B, the carbon fiber reinforced plastic composite 20 may be positioned at the portion of the bumper back-beam 100 which bends during a collision, when stress is theoretically zero, therefore the efficiency may decrease. Further, as shown in FIG. 2C, when the carbon fiber reinforced plastic composite 20 is disposed on the exterior, a shock load may be applied to the carbon fiber reinforced plastic composite 20 during a collision, and the efficiency may decrease.

As in the cross-sectional structure of the bumper back-beam 100 according to an exemplary embodiment during a high-speed collision, the glass fiber mat reinforced plastic composite 10 may primarily resist a substantial shock load at the front and the carbon fiber reinforced plastic composite 20 having high performance may resist the substantial shock load at the rear. The glass fiber mat reinforced plastic composite 10 may include polypropylene at about 45 to 60 wt. %, glass fiber at about 35 to 45 wt. %, a crosslink agent at about 0.1 to 10 wt. %, peroxide at about 0.1 to 4 wt. %, and an antioxidant at about 0.1 to 4 wt. %.

The glass fiber mat reinforced plastic composite 10 may contribute to improving properties when the glass fiber reinforcing materials are combined with the polypropylene. In the present invention, the bonding force of the polypropylene and the glass fiber may increase by adding the crosslink agent. The crosslink agent may not be limited to specific substances, but maleic anhydride may be used. For example, peroxide may be added to control the melt index MI of the polypropylene, and the antioxidant may be added to prevent oxidation of the polypropylene. The antioxidant may not be limited to specific substances, but IRGANOX may be used.

Additionally, the glass fiber may include a uni-direction glass fiber and a random direction glass fiber, therefore the properties may be approved not only in the machine direction, but also in the transverse direction. In particular, the entire glass fiber may include a uni-direction glass fiber at about 40 to 60 wt. % and a random direction glass fiber at about 40 to 60 wt. %. Using a glass fiber treated with a sizing agent may further increase the bonding force between the polypropylene and the glass fiber. An aminosilane may be used as the sizing agent.

The carbon fiber reinforced plastic composite 20 may include thermoplastic resin at about 40 to 60 wt. % and a carbon reinforced fiber at about 40 to 60 wt. % arranged in a predetermined direction. In particular, mixing the glass fiber mat reinforced plastic composite 10, with the carbon fiber reinforced plastic composite 20 may further include the addition of polypropylene as the thermoplastic resin. The carbon reinforced fiber may be included at about 40 to 60 wt. %. When an insufficient amount of carbon reinforced fiber is included, sufficient tensile strength may not be achieved. Further, when excess carbon reinforced fiber is included, the bonding force with polypropylene may be decreased. Accordingly, the content of the carbon reinforced fiber may be adjusted within the range as described above.

The carbon fiber reinforced plastic composite 20 may have a tensile strength of about 1.0 to 1.4 GPa and a tensile modulus of about 65~80 GPa, when it is disposed within the glass fiber mat reinforced plastic composite. Consequently, the properties of the bumper back-beam for a vehicle in conjunction with the glass fiber mat reinforced plastic composite may be enhanced.

In particular, the bumper back-beam for a vehicle according to an exemplary embodiment may resist a substantial shock load, thereby providing support for an automotive front bumper back-beam 100. The carbon fiber reinforced plastic composite 20 may include a layer made of a carbon reinforced fiber that may be arranged in the machine direction and a layer made of a carbon reinforced fiber that may be arranged in the transverse direction. For example, by including the layer made of a carbon reinforced fiber arranged in the machine direction and a layer 21 made of a carbon reinforced fiber arranged in the transverse direction, the elastic modulus and tensile strength in the machine direction and the transverse direction may be improved.

Figure 3:
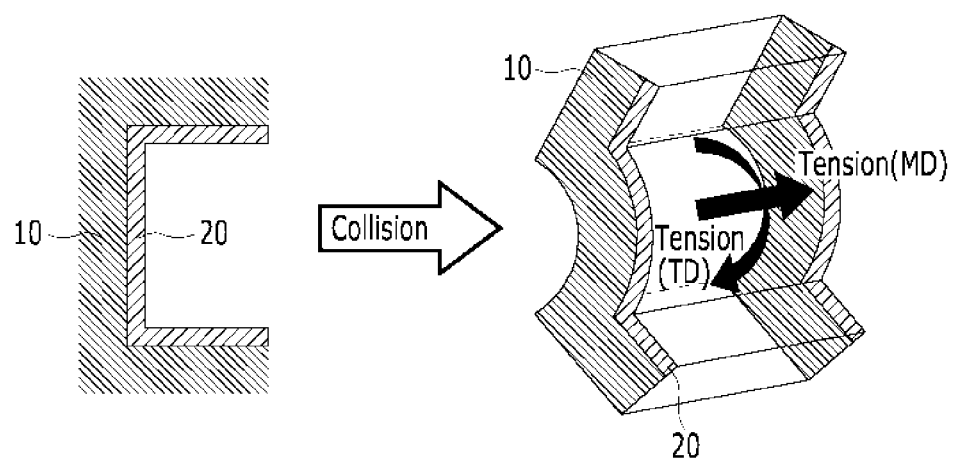
FIG. 3 is an exemplary embodiment of a view schematically showing tension in a machine direction and a transverse direction in a bumper collision.

As shown in FIG. 3, in the bumper back-beam 100 for a vehicle, the tension may be generated in the machine direction and in the transverse direction during a collision. For example, when the carbon fiber reinforced plastic composite 20 includes a layer 22 made of a carbon reinforced fiber arranged in the machine direction without the layer 21 made of a carbon reinforced fiber arranged in the transverse direction, regardless of whether the elastic modulus and tensile strength in the machine direction are high, the elastic modulus and tensile strength in the transverse direction are low therefore, the bumper may be damaged during a collision. However, when the carbon fiber reinforced plastic composite 20 includes both of the layer 22 made of a carbon reinforced fiber arranged in the machine direction and the layer 21 made of a carbon reinforced fiber arranged in the transverse direction, the elastic modulus and tensile strength in the machine direction and the transverse direction may be improved, thereby reducing the possibility of breaking of a bumper during a collision.

The carbon fiber reinforced plastic composite 20 may include, within the carbon reinforced fiber, a carbon reinforced fiber at about 40 to 60 wt. % arranged in the machine direction and a carbon reinforced fiber at about 40 to 60 wt. % arranged in the transverse direction. The elastic modulus and tensile strength in the machine direction and the transverse direction may be improved within the range described above. Further, the carbon fiber reinforced plastic composite 20 may have a structure in which the layer 22 made of a carbon reinforced fiber arranged in the machine direction and the layer 21 made of a carbon reinforced fiber arranged in the transverse direction are alternately stacked in two or more layers. In this configuration, the elastic modulus and tensile strength in the machine direction and the transverse direction may be improved.

The following examples illustrate the present invention in more detail. However, the following exemplary embodiments are just examples of the present invention, and the present invention is not limited thereto.

Exemplary Embodiment 1

Figure 4A:
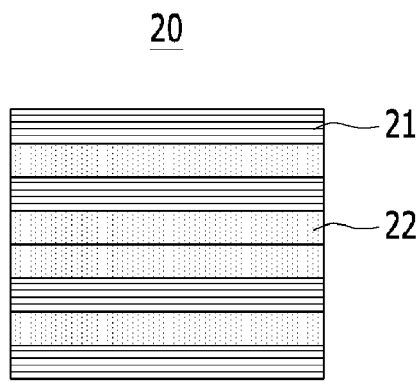
FIGS. 4A-4B- are exemplary embodiments of views schematically showing the structures of a carbon fiber reinforced plastic composite produced in Exemplary Embodiment 1 and a carbon fiber reinforced plastic structure produced in Exemplary Embodiment 5.

A glass fiber mat reinforced plastic composite (hereinafter "GMT") having a thickness of 4.7 mm was produced by impregnating a matrix containing homo grade polypropylene at 56 wt. %, maleic anhydride at 2 wt. %, peroxide at 1 wt. %, and IRGANOX which is an antioxidant at 2 wt. % into a glass fiber mat. A carbon fiber reinforced plastic composite (hereinafter "CFRP") having a thickness of 0.25 mm was produced by impregnating polypropylene at 50 wt. % into a carbon reinforced fiber (Torey T700). In the whole carbon reinforced fiber, a carbon reinforced fiber at 50 wt. % arranged in the machine direction and a carbon reinforced fiber at 50 wt. % arranged in the transverse direction were used. A schematic structure of the CFRP sheet is shown in FIG. 4A. A front bumper back-beam was formed through press forming by stacking a GMT sheet onto the produced CFRP sheet, preheating it, putting it with the CFRP within a mold, and then pressing it.

The elastic modulus and tensile strength in the machine direction and the transverse direction of the manufactured front bumper back-beam were measured and are shown in the following Table 1. Performance of the front bumper back-beam was measured, using a balance sheet method and it was determined that there were no cracks or breaks.

Exemplary Embodiment 2

Exemplary Embodiment 2 was performed under the same conditions as Exemplary Embodiment 1, except the carbon reinforced fiber, had a 60 wt. % arranged in the machine direction and a 40 wt. % arranged in the transverse direction. The elastic modulus and tensile strength in the machine direction and the transverse direction of the manufactured front bumper back-beam were measured and are shown in the following Table 1.

Exemplary Embodiment 3

Exemplary Embodiment 3 was performed under the same conditions as Exemplary Embodiment 1, except the carbon reinforced fiber, has a 70 wt. % arranged in the machine direction and a 30 wt. % arranged in the transverse direction. The elastic modulus and tensile strength in the machine direction and the transverse direction of the manufactured front bumper back-beam were measured and are shown in the following Table 1.

Exemplary Embodiment 4

Exemplary Embodiment 4 was performed under the same conditions as Exemplary Embodiment 1, except the carbon reinforced fiber, had a 80 wt. % arranged in the machine direction and a 20 wt. % arranged in the transverse direction. The elastic modulus and tensile strength in the machine direction and the transverse direction of the manufactured front bumper back-beam were measured and are shown in the following Table 1.

Exemplary Embodiment 5

Figure 4B:
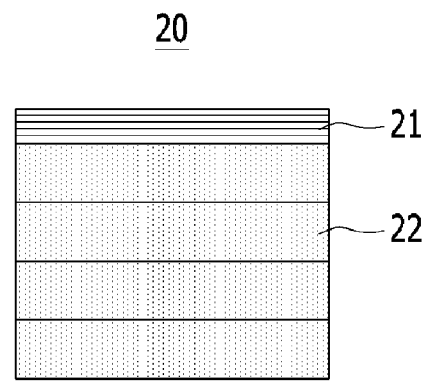

Exemplary Embodiment 5 was performed under the same conditions as Exemplary Embodiment 1, except the carbon reinforced fiber had a 90 wt. % arranged in the machine direction and a 10 wt. % arranged in the transverse direction. A schematic structure of the CFRP sheet is shown in FIG. 4B. The elastic modulus and tensile strength in the machine direction and the transverse direction of the manufactured front bumper back-beam were measured and are shown in the following Table 1. Furthermore, performance of the front bumper back-beam was measured in a balance sheet method, and it was determined that there was cracking and carbon that was damaged due to breaking of the rear portion.

Exemplary Embodiment 6

Exemplary Embodiment 6 was performed under the same conditions except for using a carbon reinforced fiber arranged in the machine direction. The elastic modulus and tensile strength in the machine direction and the transverse direction of the manufactured front bumper back-beam were measured and are shown in the following Table 1.

TABLE 1

| | | Exemplary embodiment 1 | Exemplary embodiment 2 | Exemplary embodiment 3 | Exemplary embodiment 4 | Exemplary embodiment 5 | Exemplary embodiment 6 |
|---|---|---|---|---|---|---|---|
| MD/TD weight ratio | | 50/50 | 60/40 | 70/30 | 80/20 | 90/10 | 100/0 |
| Elastic modulus (GPa) | MD | 41 | 48.8 | 56.6 | 64.4 | 72.2 | 80 |
| | TD | 41 | 33.2 | 25.4 | 17.6 | 9.8 | 2 |
| Tensile strength (GPa) | MD | 700 | 834 | 968 | 1102 | 1236 | 1370 |
| | TD | 700 | 566 | 432 | 298 | 164 | 30 |

As shown in Table 1, the elastic modulus and tensile strength in the machine direction and the transverse direction may be increased in Exemplary Embodiment 1 and Exemplary Embodiment 2, in which the weight ratio of the carbon reinforced fiber arranged in the machine direction and the carbon reinforced fiber arranged in the transverse direction was appropriately controlled, as compared with other exemplary embodiments, so they were suitable for a front bumper back-beam for a vehicle.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims. Therefore, the exemplary embodiments described above are only examples and should not be construed as being limitative in any respects.

DESCRIPTION OF SYMBOLS

100: Bumper back-beam
10: Glass fiber mat reinforced plastic composite
20: Carbon fiber reinforced plastic composite
21: Layer made of a carbon reinforced fiber arranged in transverse direction TD
22: Layer made of a carbon reinforced fiber arranged in machine direction MD

What is claimed is:

1. A bumper back-beam for a vehicle, comprising:
a glass fiber mat reinforced plastic composite and a carbon fiber reinforced plastic composite;
wherein the glass fiber mat reinforced plastic composite includes polypropylene at about 45 to 60 wt. %, glass fiber at about 35 to 45 wt. %, a crosslink agent at about 0.1 to 10 wt. %, peroxide at about 0.1 to 4 wt. %, and an antioxidant at about 0.1 to 4 wt. %; and
wherein the carbon fiber reinforced plastic composite includes a thermoplastic resin at about 40 to 60 wt. % and a carbon reinforced fiber at about 40 to 60 wt. % arranged in a predetermined direction,
wherein the carbon fiber reinforced plastic composite includes a layer made of a carbon reinforced fiber arranged in a machine direction and a layer made of a carbon reinforced fiber arranged in a transverse direction.

2. The bumper back-beam of claim 1, wherein the carbon fiber reinforced plastic composite has a structure in which the layer made of a carbon reinforced fiber arranged in the machine direction and the layer made of a carbon reinforced fiber arranged in the transverse direction are alternately stacked in a plurality of layers.

3. The bumper back-beam of claim 1, wherein the carbon fiber reinforced plastic composite includes, within the whole carbon reinforced fiber, a carbon reinforced fiber at about 40 to 60 wt. % arranged in the machine direction and a carbon reinforced fiber at about 40 to 60 wt. % arranged in the transverse direction.

4. The bumper back-beam of claim 1, wherein the thermoplastic resin is polypropylene.

5. The bumper back-beam of claim 1, wherein the glass fiber includes a uni-direction glass fiber and a random direction glass fiber.

6. The bumper back-beam of claim 5, wherein the entire glass fiber includes a uni-direction glass fiber at about 40 to 60 wt. % and a random direction glass fiber at about 40 to 60 wt. %.

7. The bumper back-beam of claim 1, wherein the glass fiber mat reinforced plastic composite includes a glass fiber treated with a sizing agent.

8. The bumper back-beam of claim 1, wherein the carbon fiber mat reinforced plastic composite is disposed within the glass fiber mat reinforced plastic composite.

9. The bumper back-beam of claim 1, wherein the carbon fiber mat reinforced plastic composite is disposed beside the glass fiber mat reinforced plastic composite disposed within the glass fiber mat reinforced plastic composite.

* * * * *